United States Patent
Riggs, Jr. et al.

(10) Patent No.: US 6,662,526 B2
(45) Date of Patent: Dec. 16, 2003

(54) MODULAR TURRET CAGE FOR A CAPPING MACHINE

(75) Inventors: Donald A Riggs, Jr., Dayton, NY (US); Angela M. Comstock, Roanoke, VA (US); Randy Uebler, Sacramento, CA (US); Darwin Ellis, Martinsville, IN (US)

(73) Assignee: Alcoa Closure Systems International, Inc., Crawfordsville, IN (US)

( * ) Notice: Subject to any disclaimer, the term of this patent is extended or adjusted under 35 U.S.C. 154(b) by 0 days.

(21) Appl. No.: 10/151,284

(22) Filed: May 20, 2002

(65) Prior Publication Data

US 2003/0097816 A1 May 29, 2003

Related U.S. Application Data

(60) Provisional application No. 60/333,611, filed on Nov. 27, 2001.

(51) Int. Cl.[7] ................................................. B65B 7/28
(52) U.S. Cl. ........................ 53/308; 53/317; 53/331.5; 53/338
(58) Field of Search ........................... 53/302–304, 306, 53/308, 310, 317, 331.5, 338, 367

(56) References Cited

U.S. PATENT DOCUMENTS

| | | | |
|---|---|---|---|
| 3,345,800 A | | 10/1967 | Volker |
| 3,660,963 A | * | 5/1972 | Sullivan .................... 53/338 |
| 3,760,561 A | * | 9/1973 | Over et al. .................... 53/338 |
| 4,099,361 A | * | 7/1978 | Dix et al. .................... 53/338 |
| 4,535,585 A | * | 8/1985 | Gardos ........................ 53/308 |
| 4,696,144 A | | 9/1987 | Bankuty et al. |
| 4,939,890 A | | 7/1990 | Peronek et al. |
| 5,157,897 A | | 10/1992 | McKee et al. |
| 5,398,485 A | | 3/1995 | Osifchin |
| 5,457,936 A | | 10/1995 | Neel |
| 5,490,369 A | | 2/1996 | Ellis et al. |
| 5,826,400 A | | 10/1998 | Martin et al. |

OTHER PUBLICATIONS

U.S. Ser. No. 10/194,637, filed Jul. 12, 2002, entitled "Method to Prevent Container Rotation Associated with a Capping Machine"—Riggs et al.

* cited by examiner

Primary Examiner—Stephen F. Gerrity
(74) Attorney, Agent, or Firm—Christian E. Schuster; Tracey D. Beiriger

(57) ABSTRACT

The modular turret cage is used with a capping machine adapted to apply closures to containers, such as beverage, food, or water containers. The capping machine includes a stationary cap. The modular turret cage has a top end and a bottom end. The top end of the turret cage is rotatably received in the stationary cap. The turret cage includes a top mounting plate at the top end of the turret cage and a base mounting plate at the bottom end of the turret cage. A plurality of panel sections extends between and connects the top mounting plate and the base mounting plate. The panel sections are fixedly connected to the top mounting plate and the base mounting plate and are separately removable from the top mounting plate and the base mounting plate.

17 Claims, 9 Drawing Sheets

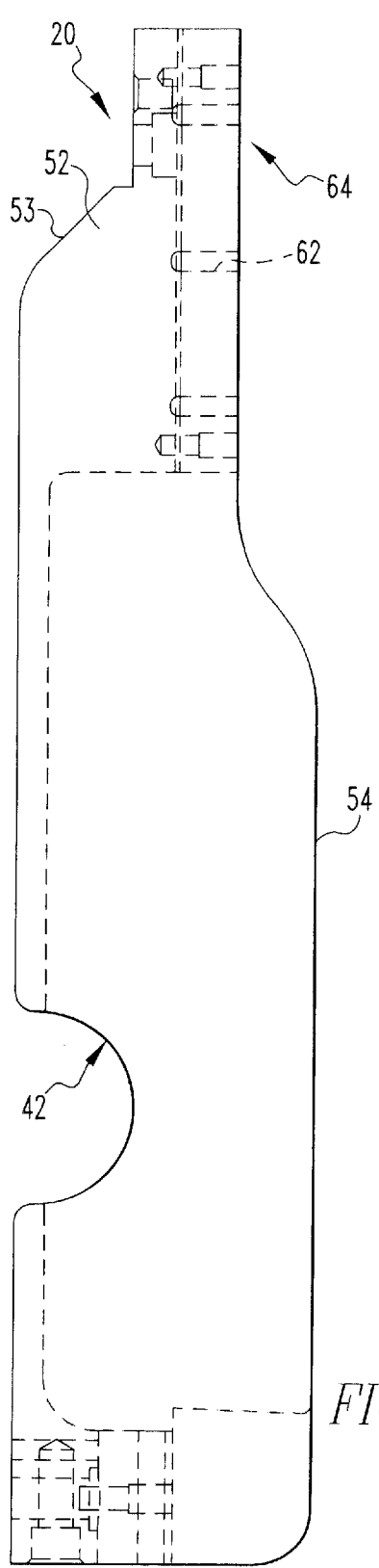
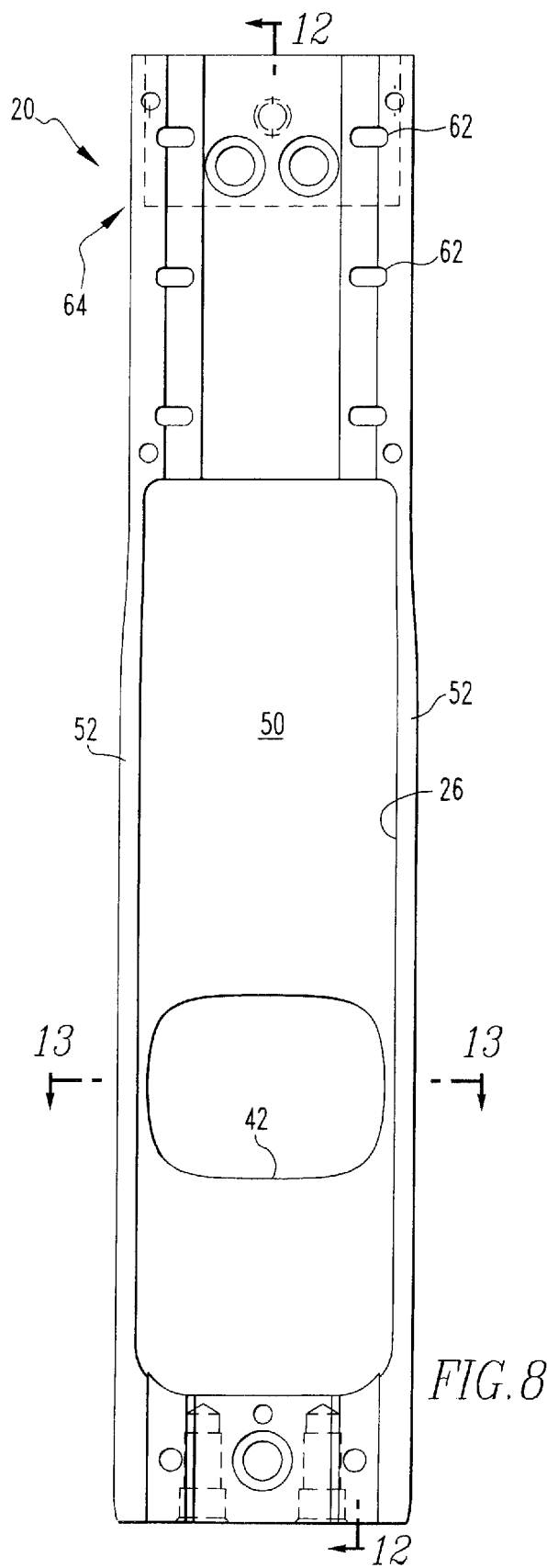
FIG. 9
FIG. 8

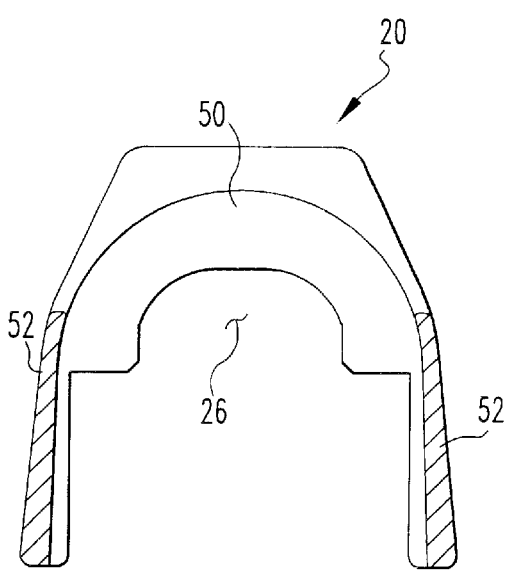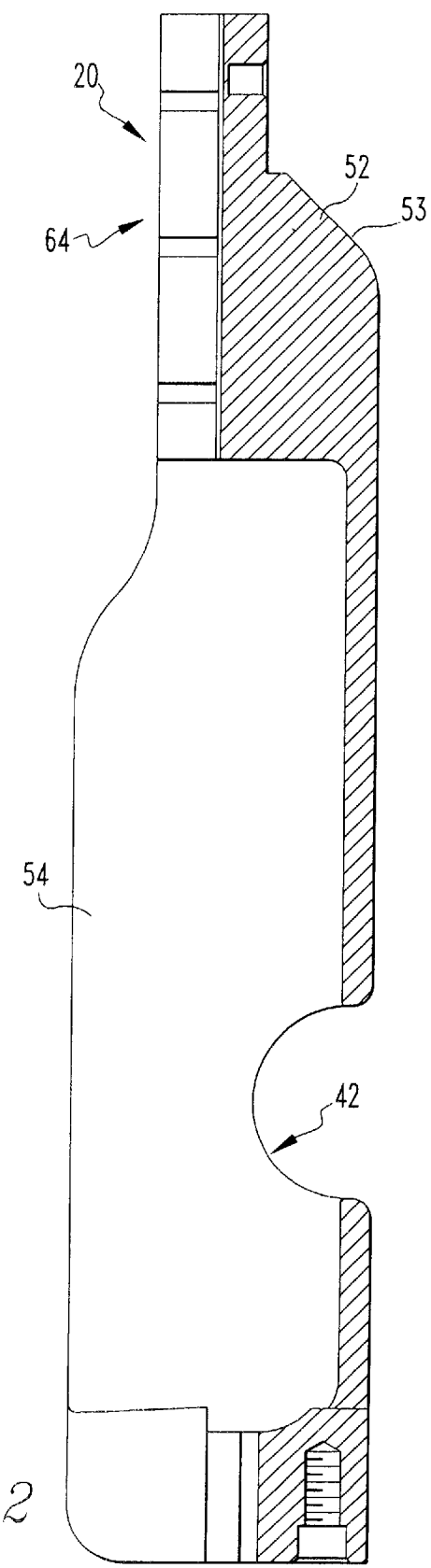
FIG.13
FIG.12

MODULAR TURRET CAGE FOR A CAPPING MACHINE

CROSS-REFERENCE TO RELATED APPLICATION

This application claims the benefit of U.S. Provisional Application Serial No. 60/333,611, filed Nov. 27, 2001, entitled "Modular Turret Cage For A Capping Machine", which is incorporated herein in its entirety.

BACKGROUND OF THE INVENTION

1. Field of the Invention

The present invention relates to capping machines for applying caps to containers, such as beverage, food, and water containers, and, more particularly, to a modular turret cage for use with such machines, 2. Description of the Prior Art Capping machines are used in the art to apply caps to containers, such as beverage, food, and water containers. For example, capping machines are used to apply plastic or metal caps to plastic, glass, and metal containers. Containers for beverages, food, and water are often provided as bottles and may have wide bottle openings or narrow bottle openings. Capping machines must be able to apply caps to both "wide mouth" and "narrow mouth" bottles.

Capping machines known in the art generally include capping turrets that are used to apply the caps to the bottles. Capping turrets presently used in the art are typically cast as one-piece castings. Such one-piece castings are expensive to fabricate and require a substantial lead-time for their manufacture. The resulting cast structure is bulky and not easily manipulated. Additionally, each capping turret is essentially provided as a custom-made unit and, thus, each individual turret must be individually designed and fabricated, which further increases their cost. Each individual capping turret must be designed for each pitch diameter filler and/or number of heads in the capping machine. The one-piece casting design used in the art may be reused only on capping machines of the same pitch diameter and equivalent number of heads.

In view the foregoing, it is an object of the present invention to provide an improved turret cage for a capping machine that reduces the cost associated with designing and machining turret cages for capping machines. It is a further object of the present invention to provide a modular, but standardized, turret cage that may be used on different capping machines with only minor adjustments. It is a specific object of the present invention to provide a modular turret cage for use with capping machines that overcomes the disadvantages of one-piece cast turret cages discussed previously.

SUMMARY OF THE INVENTION

The above objects are accomplished with a capping machine and modular turret cage made in accordance with the present invention. The turret cage is intended for use with a capping machine generally adapted to apply caps (i.e., closures) to containers. The turret cage is preferably adapted to apply plastic caps to plastic containers suitable for use in storing beverages, food, or water, but the present invention envisions that the turret cage may be used to apply plastic or metal caps to plastic, glass, or metal containers.

The capping machine of the present invention includes a stationary cap and a modular turret cage rotatably received in the stationary cap. The modular turret cage has a top end and a bottom end. The top end of the turret cage is rotatably received within the stationary cap. The turret cage further includes a top mounting plate located at the top end of the turret cage, a base mounting plate located at the bottom end of the turret cage, and a plurality of panel sections extending between and connecting the top mounting plate and the base mounting plate. The individual panel sections are preferably fixedly but removably connected to the top mounting plate and the base mounting plate.

The panel sections may be substantially U-shaped in horizontal cross-section and have a center portion and two outward projecting fins. The fins of each of the panel sections may define a recess therebetween for receiving a spindle of the capping machine. The panel sections may each have a top end fixedly secured to the top mounting plate. The panel sections may each include a cover plate attached to the top end of the panel section for restricting outward movement of the spindle.

The panel sections may each further include a bulged portion formed in the center portion on an opposite side of the panel section from the fins. The plurality of panel sections may be positioned such that the bulged portion of each of the panel sections faces inward toward a central axis of the turret cage. The base mounting plate may define a plurality of cutout sections around the circumference thereof. The cutout sections may be defined between respective pairs of outward extending projections, which extend circumferentially around the base mounting plate. The fins of the panel sections may be fixedly secured, respectively, to two adjacent projections around the circumference of the base mounting plate.

The capping machine may further include a center gear disposed inside of the plurality of panel sections. The panel sections may each define a central aperture for allowing the teeth of the center gear to coact with the spindle received in the recess defined by the fins of each of the panel sections. The panel sections may be made of steel, stainless steel, or ductile iron. The top mounting plate and the base mounting plate may be made of stainless steel.

The present invention is also a method of assembling a modular turret cage for use in connection with a capping machine adapted to apply caps (i.e., closures) to containers. The method may comprise the steps of: providing a circular-shaped base mounting plate; providing a circular-shaped top mounting plate spaced from the base mounting plate; connecting the base mounting plate and top mounting plate with a plurality of panel sections spaced around the circumference of the base mounting plate and the top mounting plate; and individually and removably securing the respective panel sections to the base mounting plate and the top mounting plate to form the turret cage.

When the capping machine includes a stationary cap, the method may include the step of rotatably receiving the top end of the turret cage in the stationary cap member. The method in accordance with the present invention may further include the steps of receiving the spindles of the capping machine into the recesses defined by the respective panel sections and preventing outward movement of the spindles with a cover plate attached to a top end of each of the panel sections.

Furthermore, the present invention may be a panel section used to assemble a modular turret cage for a capping machine. The panel section may include an elongated body having a center portion and two outward projecting fins defining spindle receiving recess therebetween. The center portion may define a central aperture. The fins may have a portion tapering to a top end of the elongated body. The panel section may further include a cover plate attached to the top end of the elongated body for restraining outward movement of a spindle received in the recess. The center portion of the panel section may define a bulged portion formed on an opposite side of the panel section from the fins. The top end of the elongated body may define a plurality of notches that define conduits for supplying lubricating fluid to a spindle received in the spindle receiving recess. The body of the panel section may be made of steel, stainless steel or ductile iron.

Further details and advantages of the present invention will become apparent from the following detailed description read in conjunction with the drawings.

BRIEF DESCRIPTION OF THE DRAWINGS

FIG. 8 is front view of the panel section of FIG. 7;

FIG. 9 is a side view of the panel section of FIG. 7;

FIG. 12 is a partial cross-sectional view taken along line 12—12 in FIG. 8; and

FIG. 13 is a partial cross-sectional view taken along line 13—13 in FIG. 8.

DETAILED DESCRIPTION OF THE PREFERRED EMBODIMENTS

Figure 1:
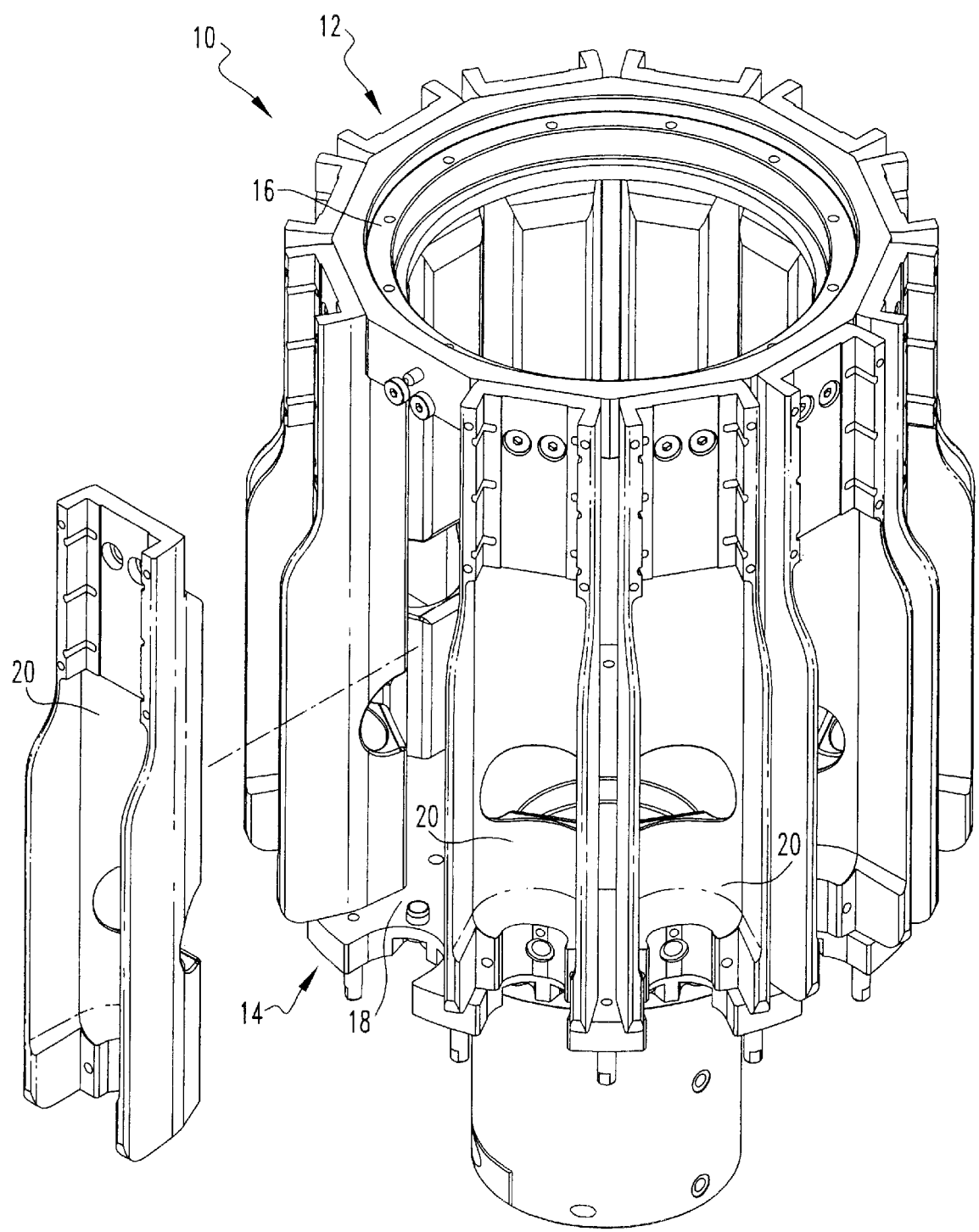
FIG. 1 is a perspective and partially exploded view of a modular turret cage in accordance with the present invention.

Referring to FIGS. 1–5, a modular turret cage 10 in accordance with the present invention is shown. The turret cage 10 includes a top end 12 and a bottom end 14. As used in this disclosure, the terms "top" and "bottom" refer to the orientation of a given element as shown in the accompanying drawings. An annular or "top" mounting plate 16 is provided at the top end 12. A base or bottom mounting plate 18 is provided at the bottom end 14 opposite from the top plate 16. The base plate 18 is annular-shaped in a similar manner to the top plate 16. The top plate 16 and base plate 18 are generally circular-shaped.

Figure 2:
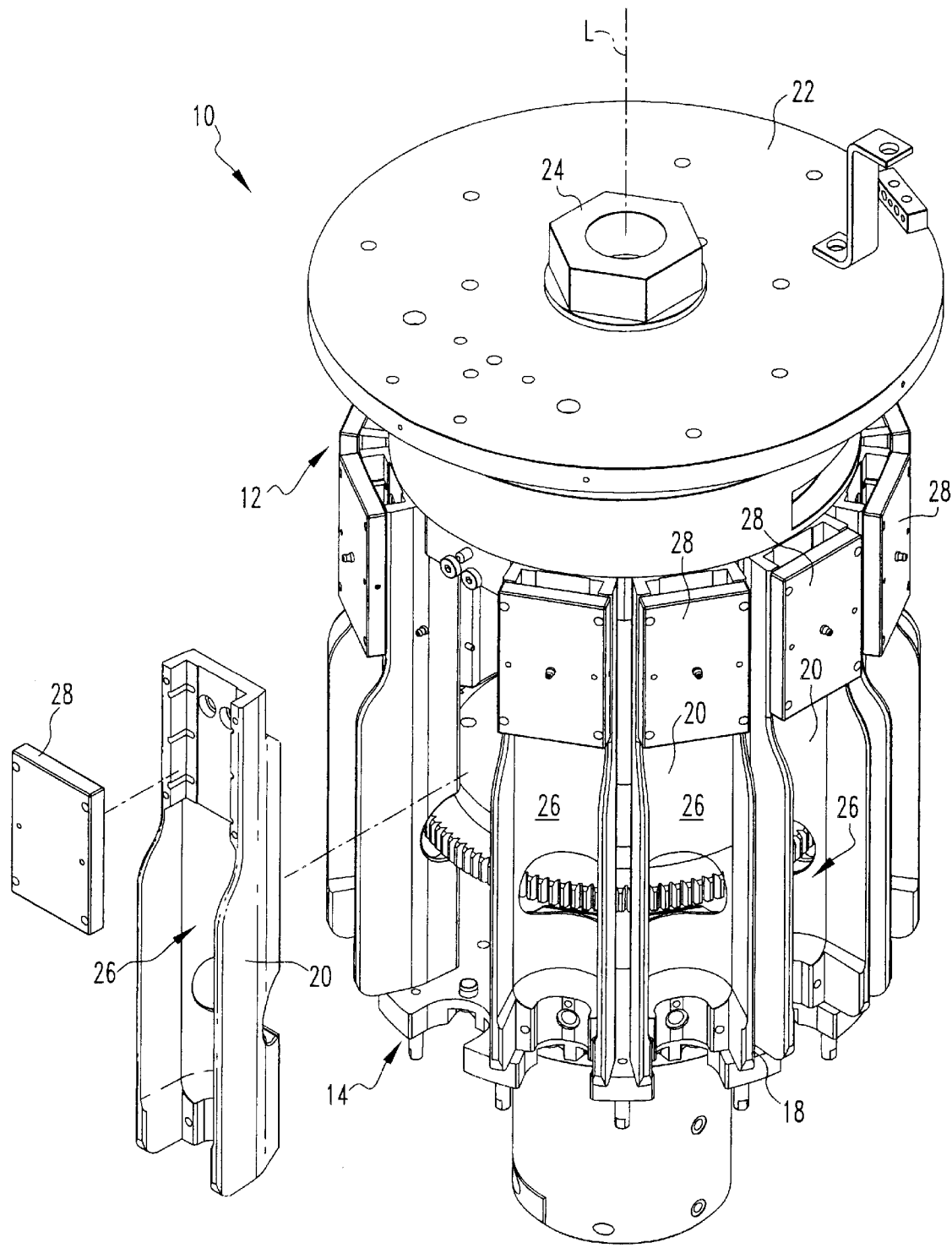
FIG. 2 is a perspective and partially exploded view of the modular turret cage of FIG. 1 with the modular turret cage shown cooperating with a stationary cap of a capping machine.
Figure 6:
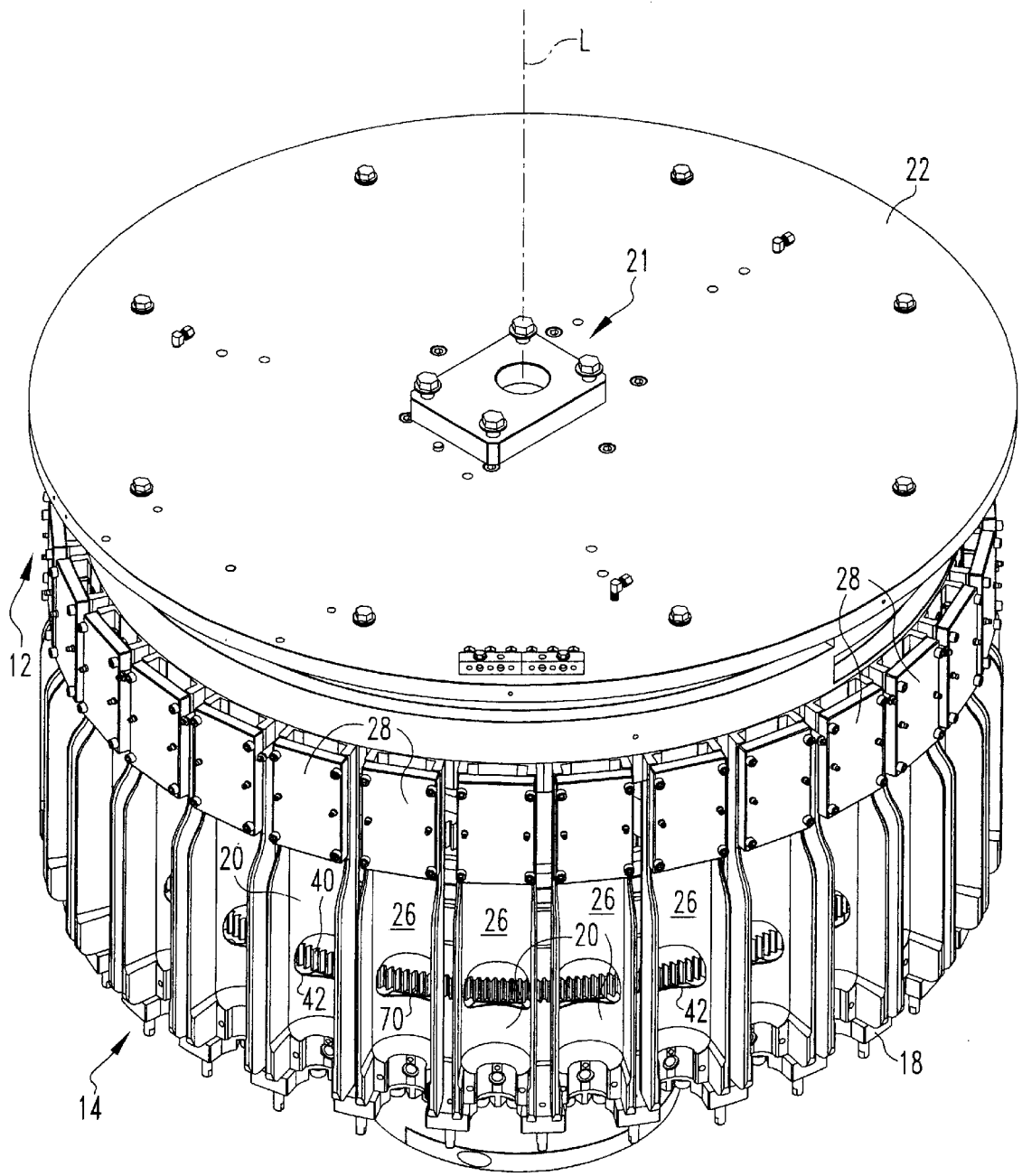
FIG. 6 is a perspective view of a second embodiment of the modular turret cage and capping machine of the present invention having additional panel sections.

The turret 10 further includes a plurality of panel sections 20 connecting the top plate 16 and the base plate 18. The assembled turret 10 is generally cylindrical in shape and the panel sections 20 are positioned around the circumference of the turret 10. The present invention envisions that any number of panel sections 20 may be used in the turret 10. FIGS. 1 and 2 show twelve panels sections 20 extending around the circumference of the turret 10. FIG. 6, discussed hereinafter, shows thirty-two panel sections 20 extending around the circumference of the turret 10. Thus, the number of panel sections 20 may be changed to suit specific production output requirements. Thus, a large number of panel sections 20 could apply a greater number of caps (i.e., closures) in the bottling process per minute, as will be appreciated by those skilled in the art. As used in this disclosure, the terms "caps" and "closures" are synonymous and refer to the physical structure used to seal a container, such as bottle.

FIG. 2 shows the turret 10 cooperating with a stationary cap or support portion 22 of a capping machine. The top end 12 of the turret 10 is received rotatably within the stationary cap 22. The stationary cap 22 may be affixed to the capping machine by conventional mechanical fasteners, such as bolts 24 and the like. The panel sections 20 are each generally U-shaped in horizontal cross section and define a recess 26 formed to receive a spindle 27 of the capping machine. The spindle 27 may be held in place within recess 26 with a cover plate 28. The cover plate 28 permits the spindle 27 to move vertically, but restricts any outward movement by the spindle 27. Each of the panel sections 20 will typically have a spindle 27 positioned therein. The spindle 27 is the rotating member of the capping machine that applies the cap or closure to the container, such as by screwing the cap or closure onto the neck of a beverage container or bottle.

Figure 3:
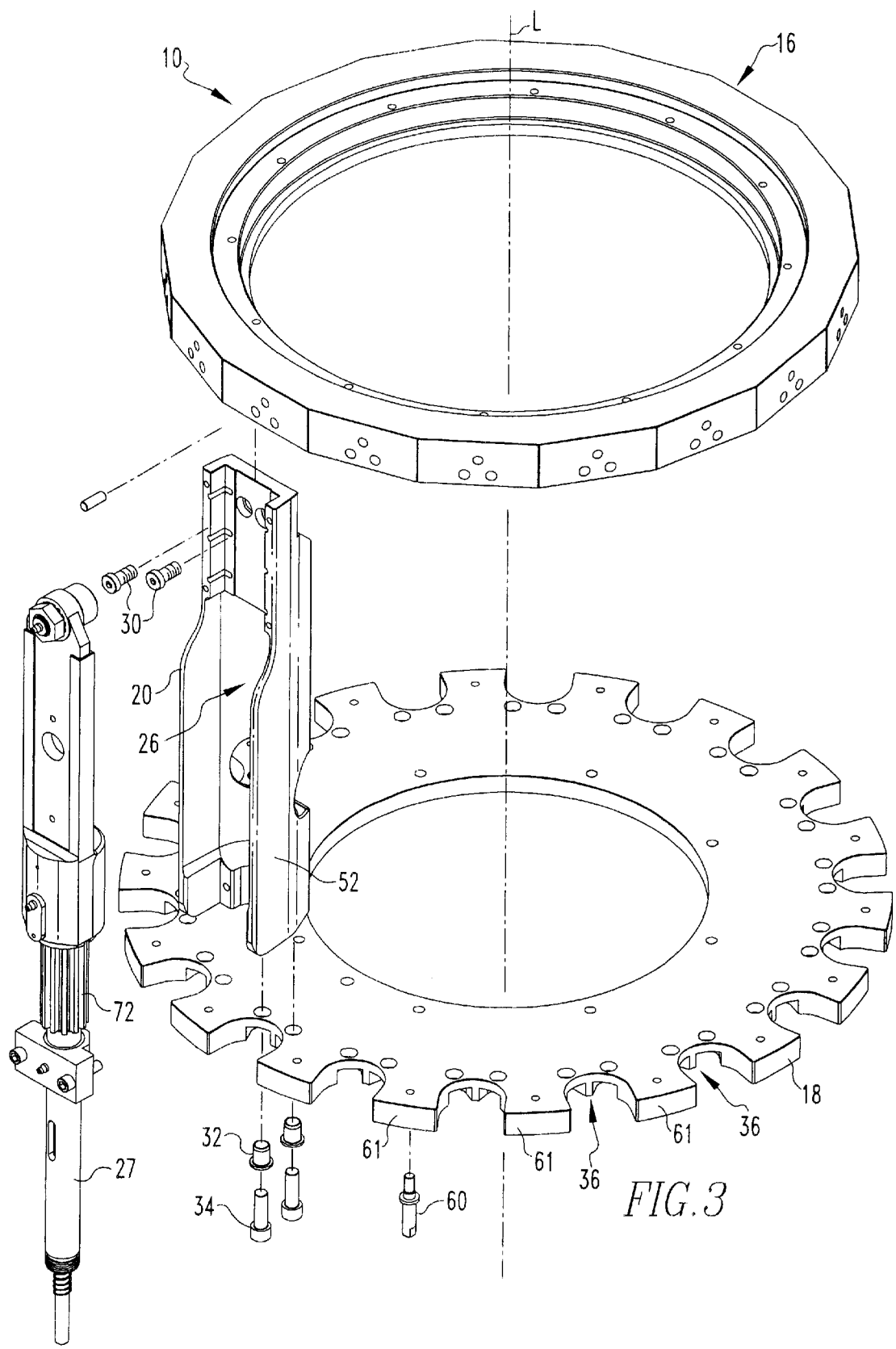
FIG. 3 is a perspective and exploded view of the modular turret cage of FIG. 1 showing individual component parts of the modular turret cage and a spindle of the capping machine.
Figure 5:
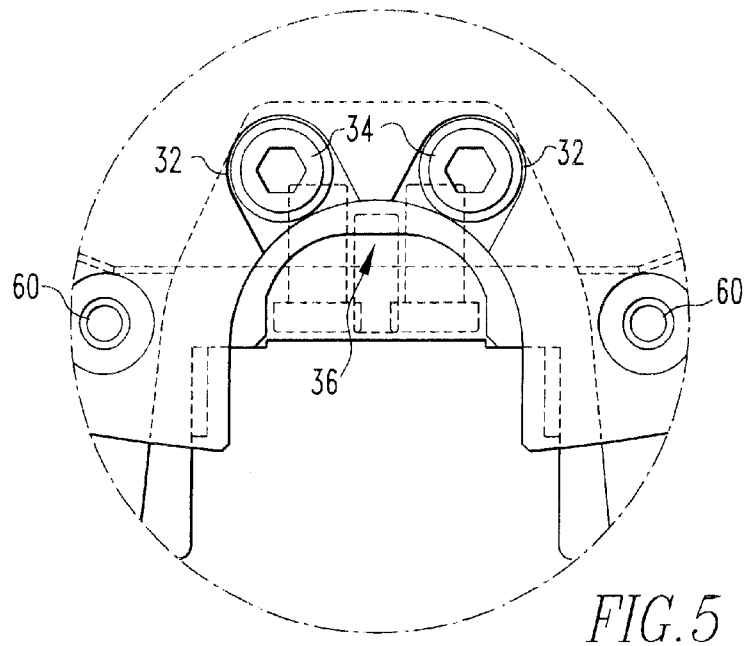
FIG. 5 is a detail view of Detail 5 in FIG. 4.
Figure 4:
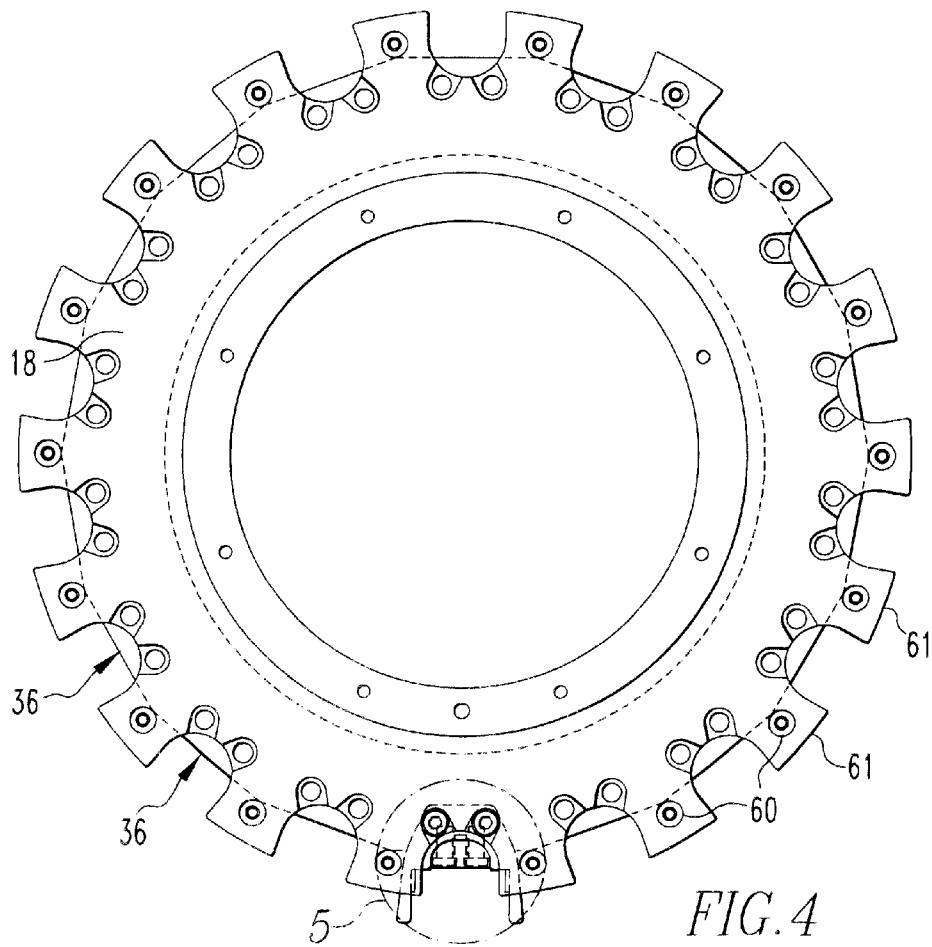
FIG. 4 is a plan view of a base mounting plate of the modular turret cage of FIG. 1.

FIGS. 3–5 shows the details of the turret 10 in accordance with the present invention. One panel section 20 is shown in FIG. 3 and is connected to the top plate 16 at the top end 12 of the turret 10 with a pair of bolts 30. The panel section 20 is connected to the base plate 18 at the bottom end 14 of the turret 10 with a pair of bushings 32 that cooperate with a pair of bolts 34. Thus, each of the panel sections 20 in the turret 10 is rigidly connected to the top plate 16 and the base plate 18. The base plate 18 further includes a plurality of substantially semi-circular or cutout sections 36. The use and function of the cutout sections 36 will be discussed herein in connection with FIGS. 7–13, but are generally provided to allow the spindles 27 of the capping machine to move up and down in the recesses 26. A single spindle 27 is shown in FIG. 3, but it will be apparent to one skilled in the art that each of the panel sections 20 in the various figures of this disclosure will have a spindle 27 associated therewith.

FIG. 6 shows a second embodiment of the turret 10 of the present invention. The turret 10 of FIG. 6 is substantially identical to the turret 10 of FIGS. 1 and 2, but includes additional panel sections 20. The turret of FIG. 6 includes thirty-two panel sections 20. As shown in FIG. 6, the turret 10 of the present invention houses an internal large center gear 40. The gear 40 is used to turn the spindles 27 (see FIG. 3) located within the panel sections 20 to twist the designated cap onto the bottle or other container, as is known in the art. To allow the teeth of the gear 40 to coact with the spindles 27, each of the panel sections 20 defines a central aperture 42.

To arrange such a large number of "linear" or vertical panel sections 20 around the circumference of the turret 10, the panel sections 20 are specially designed. Referring to FIGS. 2, 3, and 7–13, the panel sections 20 are U-shaped in horizontal cross-section, as stated previously. The panel sections 20 each include a center portion or leg 50 and two projecting fins or legs 52. The recess 26 is formed between the fins 52. As stated previously, the spindles 27 of the capping machine are received in the recesses 26 formed in the panel sections 20. The fins 52 include a tapered portion 53 at the top end 12 of the turret 10. The fins 52 generally extend outward from the turret 10. As the turret 10 rotates within the cap portion 20, the fins 52 provide the additional benefit of generating cooling air flows that help transfer heat away from the turret 10.

Figure 11:
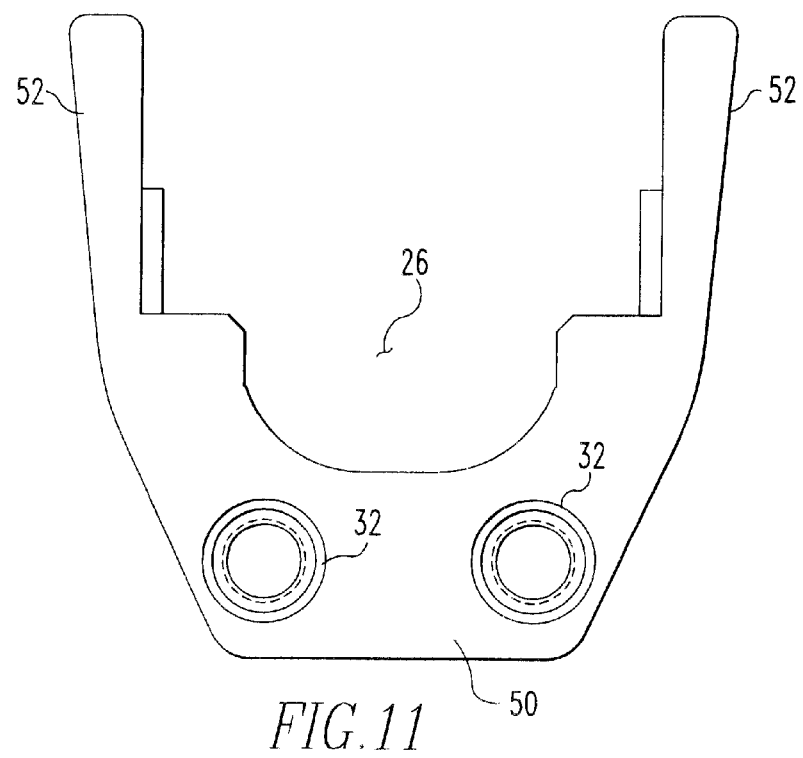
FIG. 11 is bottom view of the panel section of FIG. 7.

The panel sections 20 each further include a bulged portion 54 formed in the center portion 50 on the opposite side of the panel section 20 from the fins 52. The bulged portion 54, along with the fins 52, adds to the structural strength of the panel sections 20. The panel sections 20 are connected to the top plate 16 and the base plate 18 so that the bulged portion 54 faces inward toward a central axis L of the turret 10. As shown in FIG. 3 and, more particularly, in FIG. 7, the fins 52 are connected to the base plate 18 by mechanical fasteners, such as bolts 60 and the like. The bushings 32 and bolts 34, discussed previously, are used to affix the center leg 50 to the base plate 18 at the bottom end 14 of the turret 10. FIG. 11 is a bottom view of one of the panel sections 20 and illustrates the connection between the center leg 50 and the base plate 18 provided by the bushings 32 and bolts 34. The cutout sections 36 of the base plate 18 are formed to cooperate with the fins 52 of the panel sections 20. In particular, the fins 52 of the panel sections 20 are fixedly secured, respectively, to two adjacent projections 61 around the circumference of the base plate 18. As shown in FIG. 3, the cut-out sections 36 are each defined between adjacent pairs of the projections 61. Thus, the fins 52 are connected to adjacent pairs of the projections 61, respectively.

Figure 7:
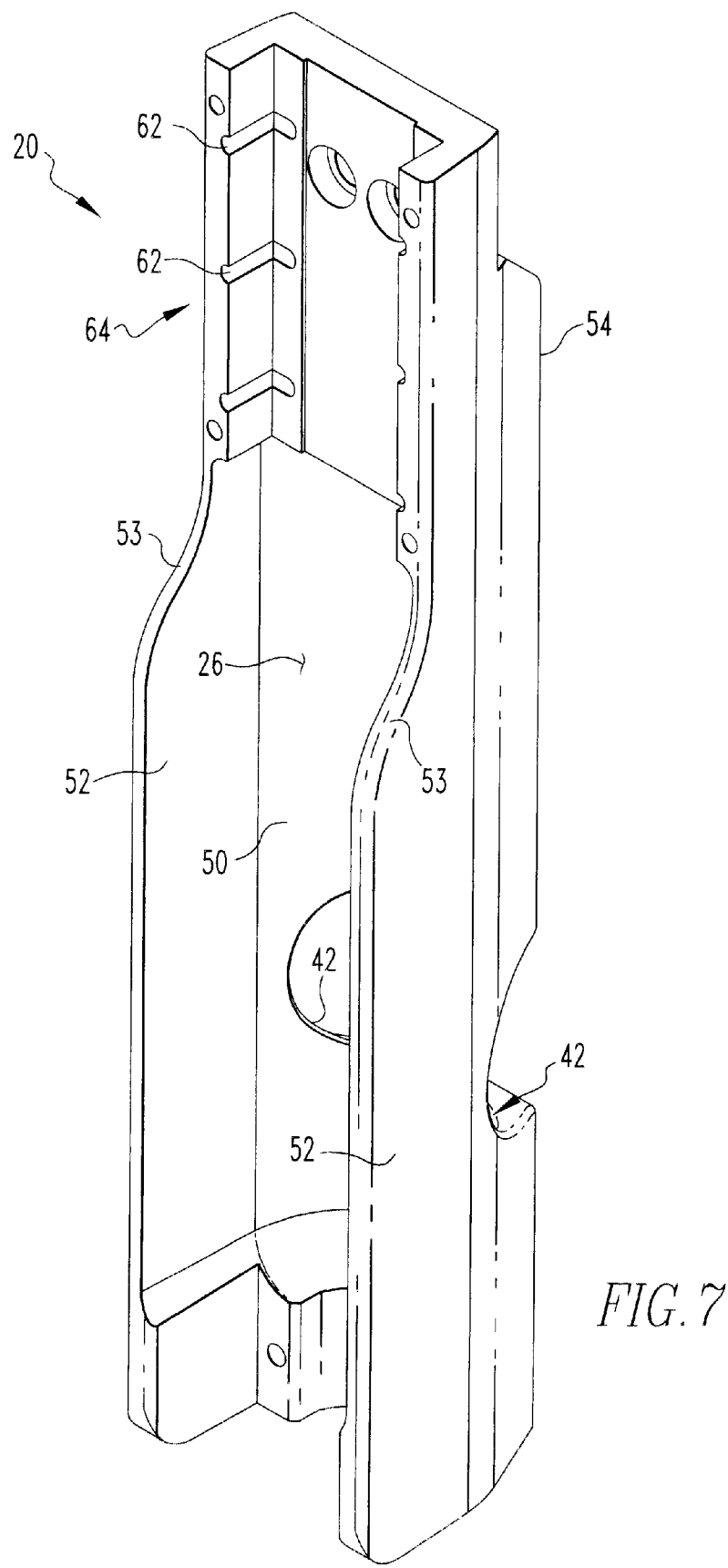
FIG. 7 is a perspective view of one of the panel sections used in the modular turret of the present invention.
Figure 10:
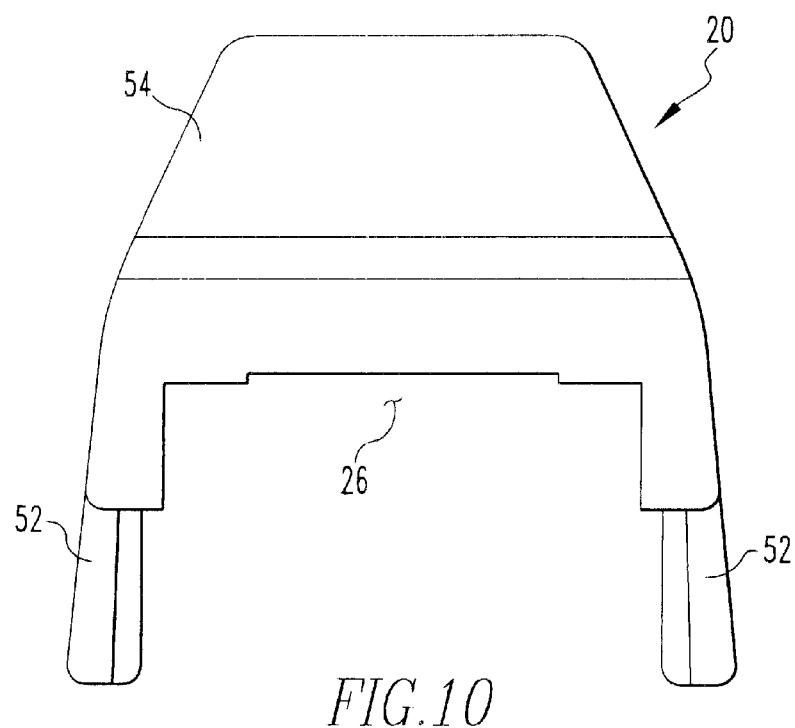
FIG. 10 is a top view of the panel section of FIG. 7.

As shown in FIG. 7, a plurality of notches 62 is formed at a top or upper end 64 of each of the panel sections 20, which define conduits for supplying lubricating fluids and the like to the spindle 27 located within recesses 26 in the panel sections 20. The panel sections 20 may be made of a ferrous-containing metal such as steel, stainless steel, or ductile iron. Ductile iron is the presently preferred material. The top plate 16 and the base plate 18 are preferably made of corrosion-resistant material such as stainless steel.

Referring to FIGS. 2 and 6, the center gear 40 includes gear teeth 70. The spindle 27 received in the recess 26 of each of the panel sections 20 also preferably has gear teeth 72 that coact with the gear teeth 70 of the center gear 40, which is disposed within the multiple panel sections 20 of the assembled turret 10. The interaction between the gear teeth 72 of the spindles 27 and the gear teeth 70 of the center gear 40 rotates the respective spindles 27 within the recesses 26 defined by the respective panel sections 20 to apply a cap (i.e., closure) to a container. The gear teeth 72 of the spindles 27 coact with the gear teeth 70 of the center gear 40 through the apertures 42 defined by the respective panel sections 20.

The turret 10 of the present invention may be changed for use on different capping machines by simply changing the size (i.e., diameter) of the top plate 16 and the base plate 18 and altering the number of panel sections 20 attached to the top plate 16 and the base plate 18. Thus, the turret 10 may be sized to accommodate different production requirements. This is particularly useful in the beverage container field, but the present invention may be applied in other container fields where a cap is being applied in a rotary fashion to a container because the capping machine manufacturing time is reduced.

The present invention was described with reference to the above-described preferred embodiments, which are merely illustrative of the present invention. Obvious modifications and alterations may be made without departing from the spirit and scope of the present invention. The present invention is defined in the appended claims and equivalents thereto.

What is claimed is:

1. A capping machine for applying caps to containers, comprising:
   a stationary cap; and
   a modular turret cage having a top end and a bottom end, with the top end of the turret cage rotatably received within the stationary cap, and with the turret cage comprising:
      a top mounting plate located at the top end of the turret cage;
      a base mounting plate located at the bottom end of the turret cage; and
      a plurality of panel sections extending between and connecting the top mounting plate and the base mounting plate.

2. The capping machine of claim 1, wherein the panel sections are each substantially U-shaped in horizontal cross-section and have a center portion and two outward projecting fins.

3. The capping machine of claim 2, wherein the fins of each of the panel sections define a recess therebetween for receiving a spindle of the capping machine.

4. The capping machine of claim 3, wherein the panel sections each include a top end fixedly secured to the top mounting plate, and wherein the panel sections each include a cover plate attached to the top end of the panel section for restricting outward movement of the spindle.

5. The capping machine of claim 3, wherein the capping machine further includes a center gear disposed inside of the plurality of panel sections, and wherein the panel sections each define a central aperture for allowing the teeth of the center gear to coact with the spindle received in the recess defined by the fins of each of the panel sections.

6. The capping machine of claim 2, wherein the panel sections each further include a bulged portion formed in the center portion, and wherein the plurality of panel sections are positioned such that the bulged portion of each of the panel sections faces inward toward a central axis of the turret cage.

7. The capping machine of claim 2, wherein the base mounting plate defines a plurality of cut-out sections around the circumference thereof, with the cut-out sections each defined between a pair of outward extending projections, which extend circumferentially around the base mounting plate, and wherein the fins of the panel sections are fixedly secured, respectively, to two adjacent projections around the circumference of the base mounting plate.

8. The capping machine of claim 1, wherein the panel sections are made of a material selected from the group consisting of steel, stainless steel, and ductile iron.

9. The capping machine of claim 1, wherein the top mounting plate and the base mounting plate are made of stainless steel.

10. A modular turret cage for use with a capping machine adapted to apply caps to containers, comprising:
    a top mounting plate located at a top end of the turret cage;
    a base mounting plate located at a bottom end of the turret cage; and
    a plurality of panel sections extending between and connecting the top mounting plate and the base mounting plate, with the panel sections each fixedly connected to the top mounting plate and the base mounting plate and separately removable from the top mounting plate and the base mounting plate.

11. The modular turret cage of claim 10, wherein the panel sections are each substantially U-shaped in horizontal cross-section and have a center portion and two outward projecting fins.

12. The modular turret cage of claim 11, wherein the fins of each of the panel sections define a recess therebetween for receiving a spindle of the capping machine.

13. The modular turret cage of claim 12, wherein the panel sections each include a top end fixedly secured to the top mounting plate, and wherein the panel sections each include a cover plate attached to the top end of the panel section for restricting outward movement of the spindle.

14. The modular turret cage of claim 12, wherein the base mounting plate defines a plurality of cut-out sections around the circumference thereof, with the cut-out sections each defined between a pair of outward extending projections, which extend circumferentially around the base mounting plate, and wherein the fins of the panel sections are fixedly secured, respectively, to two adjacent projections around the circumference of the base mounting plate.

15. The modular turret cage of claim 11, wherein the panel sections each further include a bulged portion formed in the center portion, and wherein the plurality of panel sections are positioned such that the bulged portion of each of the panel sections faces inward toward a central axis of the turret cage.

16. The modular turret cage of claim 10, wherein the panel sections are made of a material selected from the group consisting of steel, stainless steel, and ductile iron.

17. The modular turret cage of claim 10, wherein the top mounting plate and the base mounting plate are made of stainless steel.

* * * * *